(12) United States Patent
Alkhatib

(10) Patent No.: US 8,406,232 B2
(45) Date of Patent: Mar. 26, 2013

(54) 4TO6 NETWORK STACK FOR IPV4 APPLICATIONS

(75) Inventor: Hasan Alkhatib, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 185 days.

(21) Appl. No.: 12/817,964

(22) Filed: Jun. 17, 2010

(65) Prior Publication Data

US 2011/0310898 A1      Dec. 22, 2011

(51) Int. Cl.
*H04L 12/56* (2006.01)
(52) U.S. Cl. ........ 370/392; 370/390; 370/401; 370/466; 709/245; 709/249
(58) Field of Classification Search .................. 370/390, 370/392, 401, 466; 709/245, 249
See application file for complete search history.

(56) References Cited

U.S. PATENT DOCUMENTS

| 6,708,219 | B1 * | 3/2004 | Borella et al. | 709/245 |
|---|---|---|---|---|
| 7,321,598 | B2 | 1/2008 | Blanchet | |
| 7,609,717 | B2 * | 10/2009 | Miyata et al. | 370/466 |
| 7,779,111 | B2 * | 8/2010 | Shiraiwa et al. | 709/223 |
| 2001/0040895 | A1 * | 11/2001 | Templin | 370/466 |
| 2002/0012320 | A1 * | 1/2002 | Ogier et al. | 370/252 |
| 2004/0093434 | A1 | 5/2004 | Hovell | |
| 2004/0148428 | A1 | 7/2004 | Tsirtsis | |
| 2005/0182829 | A1 | 8/2005 | King et al. | |
| 2006/0095585 | A1 * | 5/2006 | Meijs et al. | 709/245 |
| 2006/0104226 | A1 | 5/2006 | Ahn | |
| 2006/0140213 | A1 * | 6/2006 | Hwang et al. | 370/466 |
| 2006/0209831 | A1 * | 9/2006 | Shepherd et al. | 370/392 |
| 2006/0209885 | A1 | 9/2006 | Hain et al. | |
| 2008/0075114 | A1 | 3/2008 | Mo | |
| 2008/0080519 | A1 | 4/2008 | Park | |
| 2009/0113521 | A1 | 4/2009 | Engdahl | |

OTHER PUBLICATIONS

Internet Protocol Version 6 (Ipv6)—Published Date: Dec. 15, 2007, 13 pages, http://technetmicrosoft.com/en-us/library/bb727113.aspx.
Internet Protocol Version 6 (IPv6)—Published Date: Aug. 6, 2004, 6 pages, http://technet.microsoft.com/en-us/library/bb457171.aspx#EFAA.
Bernstein, D.J., The IPv6 Mess—Published Date: Dec. 3, 2002, 7 pages, http://cr.yp.to/djbdns/ipv6mess.html.
Stahl, David, IPv6 Transition Methods—Published Date: Nov. 24, 2009, 3 pages, http://ciscoblog.globalknowledge.com/2009/11/24/ipv6-transition-methods/.
Teredo Tunneling, 7 pages, retrieved Jun. 17, 2010, http://en.wikipedia.org/wiki/teredo_tunneling.
Notification of Transmittal of the International Search Report and the Written Opinion of the International Searching Authority, or the Declaration in PCT/US2011/037970, dated Jan. 18, 2012, 10 pages.

* cited by examiner

*Primary Examiner* — Andrew Chriss
*Assistant Examiner* — Mohamed Kamara
(74) *Attorney, Agent, or Firm* — Shook Hardy & Bacon LLP

(57) ABSTRACT

Systems, methods and computer storage media for utilizing IPv6 addressing for globally unique identification of network endpoints when communications from or to an IPv4 compatible application. An IPv4 packet of data that is from and/or directed to an IPv4 endpoint is encapsulated in an IPv6 packet of data. An IPv6 compatible address is identified for a destination of the IPv6 packet of data. The IPv6 address is a globally unique identifier that is comprised of an IPv4 identifier that represents an IPv4 address of the encapsulated IPv4 packet. The IPv6 packet of data is communicated to the destination identified by the IPv6 address. A 4 to 6 stack may intercept the incoming IPv6 packet of data before the destination to strip the IPv6 header information revealing the IPv4 packet of data.

20 Claims, 6 Drawing Sheets

4TO6 NETWORK STACK FOR IPV4 APPLICATIONS

BACKGROUND

Communication among computing devices typically occurs through networks. In packet-switched networks, each network device is assigned an internet protocol (IP) address to identify the particular device in the network.

The dominant standard for IP addresses is internet protocol version four (IPv4). IPv4 addresses are 32 bits (4 bytes) in length, which limits the possible number of IPv4 addresses available for use to 4,294,967,296 ($2^{32}$). As the number of client devices seeking network connections continues to grow, the number of available IPv4 addresses continues to decline and will eventually reach zero. This problem is known as IPv4 address exhaustion.

Internet Protocol version 6 (IPv6) is an Internet Protocol version that has been developed to succeed IPv4. IPv6 has a vastly larger address space than IPv4. This results from the use of a 128-bit address. The IPv6 address space supports $2^{128}$ addresses.

SUMMARY

Embodiments of the present invention relate to systems, methods and computer storage media for utilizing IPv6 addressing for globally unique identification of network endpoints when communications from or to an IPv4 compatible application. An IPv4 packet of data that is from and/or directed to an IPv4 endpoint is encapsulated in an IPv6 packet of data. An IPv6 compatible address is identified for a destination of the IPv6 packet of data. The IPv6 address is a globally unique identifier that is comprised of an IPv4 identifier that represents an IPv4 address of the encapsulated IPv4 packet. The IPv6 packet of data is communicated to the destination identified by the IPv6 address. A 4 to 6 stack may intercept the incoming IPv6 packet of data before the destination to strip the IPv6 header information revealing the IPv4 packet of data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
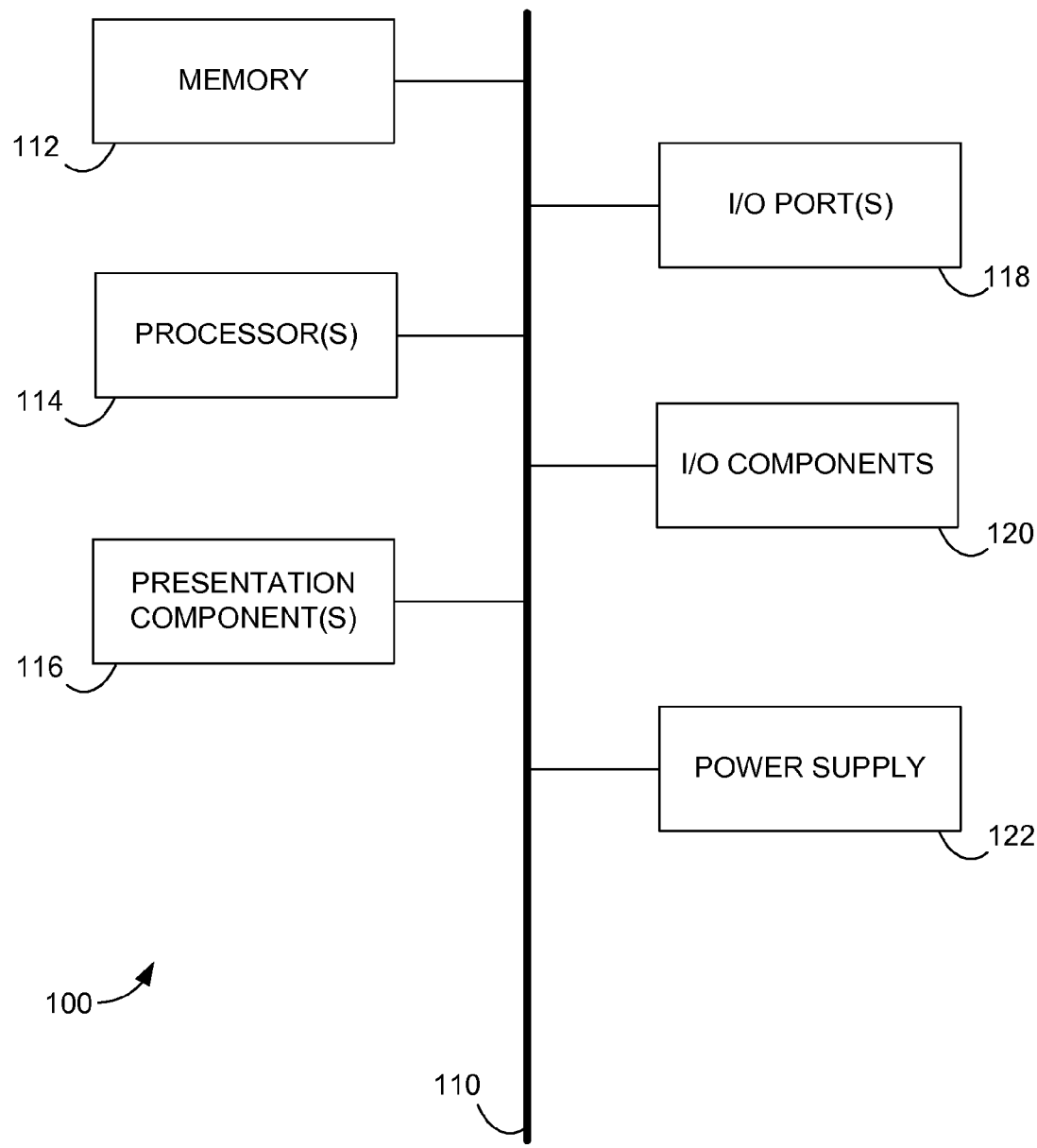
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods and computer storage media for utilizing IPv6 addressing when communications from or to an IPv4 compatible application. An IPv4 packet of data that is from and/or directed to an IPv4 endpoint is encapsulated in an IPv6 packet of data. An IPv6 compatible address is identified for a destination of the IPv6 packet of data. The IPv6 address is a globally unique identifier that is comprised of an IPv4 identifier that represents an IPv4 address of the encapsulated IPv4 packet. The IPv6 packet of data is communicated to the destination identified by the IPv6 address. A 4 to 6 stack may intercept the incoming IPv6 packet of data before the destination to strip the IPv6 header information revealing the IPv4 packet of data. Similarly, a 4 to 6 stack may intercept an outgoing IPv4 packet of data generated by a source (e.g. IPv4 application) to encapsulate it in an IPv6 header before forwarding it to a destination (e.g., (IPv4 application, IPv6 application). The unique IPv6 identifiers and a corresponding non-globally unique IPv4 identifiers are associated with each other via a dynamic Name Server and a group identifier that is a field common to all IPv6 identifiers in the communicating endpoints (e.g., source, destination).

Accordingly, in one aspect, the present invention provides a method of utilizing IPv6 addressing for communications from an IPv4 compatible application. The method includes receiving an IPv4 packet of data communicated from a first IPv4 application, wherein the packet of data is directed to a destination using an IPv4 address. Further, the method includes encapsulating the IPv4 packet of data in an IPv6 packet of data, wherein the IPv6 packet of data is directed to the destination using an IPv6 address. Additionally, the IPv6 address is comprised of the IPv4 address and a group identifier. The method also includes communicating the IPv6 packet of data to the destination using the IPv6 address.

In another aspect, the present invention provides a computer storage media having computer-executable instructions embodied thereon, that when executed by a computing system having a processor and memory, cause the computing system to perform a method. The method includes receiving an IPv6 packet of data, wherein the IPv6 packet of data is comprised of a data payload and a globally unique IPv6 address of a destination, the IPv6 address is a 128 bit identifier. A predefined number of the 128-bit identifier of the globally unique IPv6 address is an IPv4 identifier compatible with an IPv4 address. The method also includes determining a destination IPv4 address of the destination based on, at least in part, the IPv4 identifier of the globally unique IPv6 address. The method also includes communicating the data payload to the destination using the destination IPv4 address.

A third aspect of the present invention provides a system for utilizing IPv6 addressing for communications from an IPv4 compatible application. The system includes a name server accessible by way of the Internet. The system also includes a name resolution table associated with the name server. The name resolution table maintains a mapping of identifiers that are associated with a destination. The mapping of the identifiers is between a globally unique IPv6 address, a virtual network IPv4 address, and a group identifier. The system also includes an IPv4 computer application that is functional to communicate an IPv4 data packet to the destination using a private network IPv4 address. The system also includes a virtual network interface card (NIC) associated with the IPv4 computer application. The virtual NIC facilitates communicating the IPv4 data packet from the computer application to the destination. The system also includes a 4 to 6 stack in communication with the virtual NIC. The 4 to 6 stack encapsulates the IPv4 data packet in an IPv6 data packet that is comprised of a globally unique IPv6 address of the destination. The 4 to 6 stack identifies the globally unique IPv6 address utilizing a mapping in the name resolution table between the private network IPv4 address and the globally unique IPv6 address.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
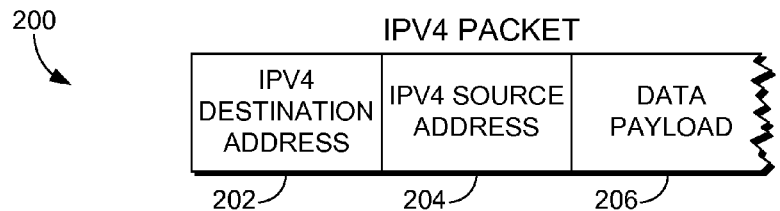
FIG. 2 illustrates an exemplary IPv4 packet of data in accordance with embodiments of the present invention.

FIG. 2 illustrates an exemplary IPv4 packet of data 200 in accordance with embodiments of the present invention. The IPv4 packet of data 200 is comprised of an IPv4 destination address 202, an IPv4 source address 204, and a data payload 206. An IPv4 address, regardless if it is associated with a destination or a source, is a 32-bit (4-byte) identifier. As a result, the IPv4 destination address and the IPv4 source address 204 each identify a particular location (e.g., application, device) accessible in a networking environment using 32 bits of information.

Historically, each IPv4 address is a globally unique identifier that is functional for particularly identifying a specified location from other locations accessible by the same network (e.g., private network, Internet). The growth of the Internet has resulted in the consumption of IPv4 addresses to the point that exhaustion of available IPv4 addresses that are unique to the Internet is inevitable. Consequently, the communication of the IPv4 packet of data 200 by way of the Internet relies on a unique identifier in the IPv4 destination address 202 to identify a destination location. The IPv4 destination address 202 identifies a destination, by a 32-bit identifier, of the IPv4 packet of data 200. Similarly, a unique identifier is desired when populating the IPv4 source address 204. The IPv4 source address 204 identifies a source, by a 32-bit identifier, of the IPv4 packet of data 200.

In an exemplary embodiment, the source of the IPv4 packet of data 200, as identified by the IPv4 source address 204, is a computing application operating in conjunction with an operating system. The computing application may be coded to use IPv4 addressing (i.e., address data packets using an IPv4 convention). In an exemplary embodiment of the present invention, the computing application is not coded to use IPv6.

When a computing application does not support IPv6 addressing, advantages inherent to IPv6 may not be gained by the computing application. For example, IPv6 employees a 128-bit address (16-byte address), which allows for a greater number of globally unique address identifiers than the 32-bit address of IPv4. As a result of some inherent differences between IPv4 and IPv6 (e.g., headers of IPv4 packets and IPv6 packets are significantly different), the two protocols are not interoperable.

The data payload 206 is the portion of the IPv4 packet of data 200 that includes the substance intended to be communicated from a source to a destination. In an exemplary embodiment, the IPv4 destination address 202 and the IPv4 source address 204 are two portions of a header associated with the IPv4 packet of data 200.

Figure 3:
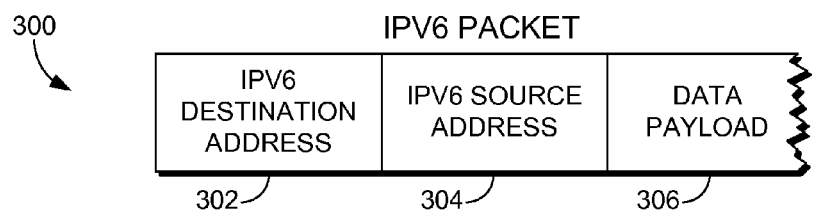
FIG. 3 illustrates an exemplary IPv6 packet of data in accordance with embodiments of the present invention.

FIG. 3 depicts an exemplary IPv6 packet of data 300 in accordance with an exemplary embodiment of the present invention. The IPv6 packet of data 300 is comprised of an IPv6 destination address 302, an IPv6 source address 304, and a data payload 306. The data payload 306 is the portion of the IPv6 packet of data 300 that typically includes the substance intended to be communicated from a source to a destination. The IPv6 destination address is an IPv6 compatible identifier of an intended recipient of the IPv6 packet of data 300. The IPv6 source address 304 is a compatible identifier of a "source" of the IPv6 packet of data 300. As will be understood, the "source" of a packet may not identify the original or generating source of the packet, but instead the "source" may identify a point (e.g., a router) along a path the packet travels to which a reply is to be directed. Therefore, it is understood that the term "source," as used herein, may refer to a point to which a response may be directed as opposed to the originating point of the data packet.

The IPv6 destination address 302 and the IPv6 source address 304 are portions that comprise a header of the IPv6 packet of data 300. Each of the IPv6 destination address 302 and the IPv6 source address 304 are a 128-bit address (16-byte address) in accordance with IPv6 conventions.

Figure 4:
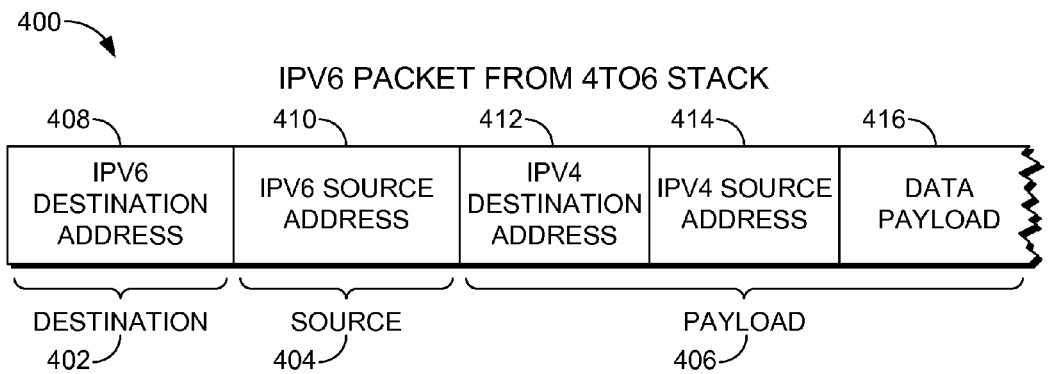
FIG. 4 illustrates an exemplary IPv6 packet of data from a 4 to 6 stack in accordance with embodiments of the present invention.

FIG. 4 depicts an exemplary IPv6 packet 400 (i.e., IPv6 data packet) in accordance with embodiments of the present invention. The IPv6 packet 400, in an embodiment, is created, in part, by a 4 to 6 stack. As will be discussed in greater detail herein, a 4 to 6 stack encapsulates an IPv4 packet within an IPv6 packet. The IPv6 packet 400 is comprised of a destination 402, a source 404, and a payload 406. As previously discussed with respect to the IPv6 packet of data 300 in FIG. 3, a destination 402 represents an intended recipient location for the IPv6 packet 400. The source 404, as previously discussed, identifies an originating location from which the IPv6 packet 400 originated (e.g., generating location, point along the communication path).

The payload 406 is an encapsulated IPv4 packet of data. For example, the IPv4 packet of data 200 discussed with respect to FIG. 2 may be generated by an IPv4 application that is not capable of addressing communication in compliance with IPv6. Therefore, as depicted at FIG. 4, an IPv4 may be encapsulated within the IPv6 packet 400 as the payload 406. As will be discussed in more detail later, the payload 406 of the IPv6 packet 400 not only include payload of an IPv4 packet, but the payload 406 may also be comprised of information typically associated with a header of the IPv4 packet (e.g., IPv4 destination address, IPv4 source address).

The destination 402 is comprised of an IPv6 destination address 408. The IPv6 destination address 408, in an exemplary embodiment, is formatted similarly to that which will be discussed with respect to FIG. 5 hereinafter. The source 404 is comprised of an IPv6 source address 410. In an exemplary embodiment, the IPv6 source address 410 is formatted similarly to that which will be discussed with respect to FIG. 5 hereinafter.

The payload 406 is comprised of an IPv4 destination address 412, an IPv4 source address 414, and a data payload 416. The IPv6 packet depicted in FIG. 4 is in accordance with an exemplary embodiment of the present invention in which a 4 to 6 stack encapsulates an IPv4 packet originating from an IPv4 capable application within an IPv6 compatible packet. Consequently, to facilitate utilization of the IPv4 packet at a destination, contents of the IPv4 packet header are maintained and transported within the IPv6 packet as part of the payload 406, in an embodiment. For example, an original IPv4 packet may (as previously discussed with respect to FIG. 2) include an IPv4 destination address and an IPv4 source address, which are depicted in the IPv6 payload 406 as IPv4 destination address 412 and IPv4 source address 414 respectively.

In an exemplary embodiment of the present invention, an IPv4 compatible application, in preparation of generating an IPv4 packet, may perform a name server (NS) request for an IPv4 address of a desired destination. In this example, the destination will be referred to as application B and the originating application will be referred to as application A. As will be described in greater detail with respect to FIG. 6, the NS may be a dynamic NS. The NS response to the request is then intercepted, in this example, by a 4 to 6 stack prior to being received by the application. The 4 to 6 stack may then launch a virtual network interface card that will service the application for incoming responses to outgoing packets. Additionally, information provided by either the NS or the 4 to 6 stack (or an associated name resolution table) may then provide to the application A an IPv4 address functional for addressing the desired destination of application B.

Consequently, in this example, the application A then generates a packet with a destination that is described by the IPv4 address provided by the NS or the 4 to 6 stack. However, as will be discussed in greater detail later, the IPv4 address provided by the NS or the 4 to 6 stack, in this example, is not globally unique. The IPv4 address is unique within a group defined, at least in part, as a group consisting of application A and application B. Stated differently, the IPv4 address provided in this example is not unique across the Internet, but it is unique among endpoints participating in a group consisting of application A and application B. This group association may be maintained in the NS.

Continuing with this example, the IPv4 packet created by application A is intercepted by the 4 to 6 stack. The intercepted IPv4 packet is encapsulated within an IPv6 packet so that an IPv6 compatible header may be implemented. It is understood that when discussed herein, an IPv6 header may be a full IPv6 header or a shortened IPv6 compatible header. The IPv6 header may include a destination (e.g., destination 402 of FIG. 4) and a source (e.g., source 404 of FIG. 4). The destination IPv6 address, in this example, is provided by a name resolution table that maps an IPv4 address, an IPv6 address, and a group identifier to each other to facilitate aspects of the present example. Therefore, in this example, the encapsulating IPv6 packet includes an IPv6 destination address that corresponds with the application B.

Once the IPv4 packet generated by application A is encapsulated within an IPv6 packet, an IPv6 header is relied on to coordinate the communication of the packet to application B while employing the advantages that may be realized by IPv6. The IPv6 packet also may then contain, as part of the data payload, the IPv4 header generated by application A. In an exemplary embodiment, upon reaching a 4 to 6 stack in line with the application B, the IPv6 header is stripped/removed from the data payload to expose the original IPv4 data packet generated by application A. The stripped IPv6 packet (now an IPv4 packet) is then passed along to application B. Application B and application A may operate without knowledge that the communicated packet passed as an IPv6 packet for a portion of the journey. Therefore, application A and application B may be legacy applications that are not updated or otherwise modified to facilitate utilization of IPv6.

Figure 5:
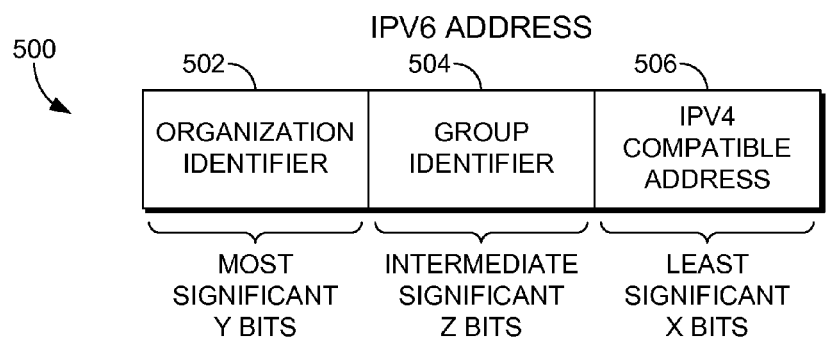
FIG. 5 depicts an IPv6 address in accordance with an exemplary embodiment of the present invention.

FIG. 5 depicts an IPv6 address 500 in accordance with an exemplary embodiment of the present invention. The IPv6 address is comprised of a standard 128 bits; however, the apportionment of those 128 bits is unique to the current embodiment. For example, the most significant Y (i.e., predefined number Y) bits of the 128 bits are utilized as an organization identifier 502. Similarly, in this example, the least significant X bits (i.e., predefined number X) bits of the 128 bits are utilized to incorporate an IPv4 compatible address 506. Additionally, in this example, intermediate-significant Z bits of the 128 bits are utilized as a group identifier 504.

An organization identifier identifies an organization. For example, an organization may be a cloud computing platform, such as AZURE by the Microsoft Corporation of Redmond, Wash. An organization may be an entity (e.g., business, government, university, city, state). An organization is not limited to those classifications suggested above.

A group identifier identifies a "group" within an organization. For example, a group may include a tenant running a service within a cloud computing platform. A group may be a collection of resources that work in combination to fulfill a responsibility within an organization (e.g., a collection of processors and computer-readable memory).

An IPv4 compatible address is an identifier that complies with requirements of IPv4. In an exemplary embodiment, an IPv4 compatible address complies with requirements of IPv4, but the IPv4 compatible address is not globally unique, but instead unique within a group identified by an associated group identifier. Consequently, it is contemplated that multiple endpoints accessible by a network (e.g., Internet) may have the same IPv4 compatible address 506 (i.e., therefore not globally unique), but the IPv4 compatible address is unique among endpoints sharing the group identifier 504.

A typical IPv4 address is comprised of 32 bits (e.g., 4 bytes). As a result, in an exemplary embodiment, the IPv4 compatible address 506 utilizes 32 of the least significant 128 bits of the IPv6 address 500. Stated differently, The IPv4 compatible address 506 consumes the least significant 32 (e.g., X bits) bits. Further, the organization identifier 502, in this example, utilizes the 64 (i.e., Y bits) most significant bits of the 128 bits. Consequently, in this example, the group identifier 504 utilizes the remaining 32 bits (i.e., Z bits) of the 128 bits as the intermediate significant bits. It is understood that other combinations of bit usage among the Y, Z, and X bits is contemplated. For example, the most significant Y bits may be reduced and the intermediate significant Z bits may be increased. However, it is understood that Y+Z+X=128 bits in an exemplary embodiment.

Figure 6:
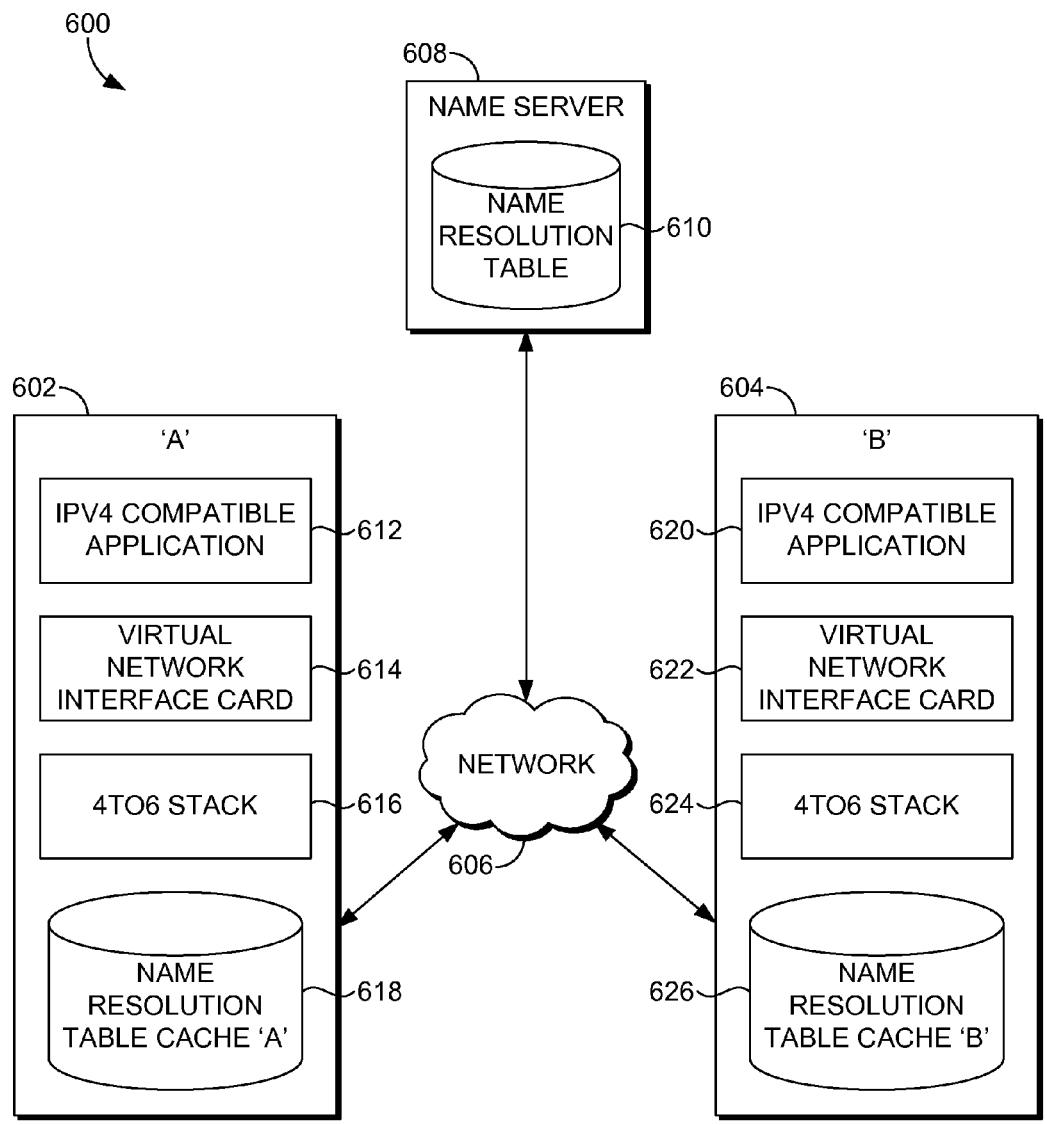
FIG. 6 depicts a block diagram of an exemplary system in accordance with embodiments of the present invention.

FIG. 6 depicts a block diagram of an exemplary system 600 in accordance with embodiments of the present invention. The system 600 is comprised of an endpoint A 602, an endpoint B 604, a network 606, and a name server (NS as indicated previously) 608. It should be understood that this and other arrangements described herein are set forth only as examples. Other arrangements and elements (e.g., devices, end points, networks, applications, tables, stacks, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each of the components shown in FIG. 6 may be any type of computing device, such as computing device 100 described with reference to FIG. 1, for example. It should be understood that any number of endpoints, networks, name servers, sources, and destinations may be employed within the system 600 within the scope of the present invention. Additionally other component not shown may also be included within the system 600.

The network 606 is a network capable of supporting IPv6 communication. It is contemplated that the network 606 may only support IPv6 in part. For example, legacy IPv4 compatible networking devices may be utilized to handle routing some communications through the network 606. When IPv4 compatible devices are utilized, at least in part, it is contemplated that well known tunneling techniques, such as IPv6 tunneling, are utilized in combination with features discussed herein. The components of FIG. 6 may communicate with each other via the network 606, which may include, without limitation, one or more local area networks (LANs) and/or wide area networks (WANs). Such networking environments are commonplace in offices, enterprise-wide computer networks, intranets, and the Internet.

In an exemplary embodiment, the NS 608 is a name server that provides name resolution services for components/devices utilizing the network 606. For example, the name server 608 may be a dynamic NS (DNS) commonly utilized in current networking environments. However, unlike traditional DNS, the NS 608 is comprised of a name resolution table 610. Among other features, the name resolution table 610 maintains a mapping of an IPv6 address (e.g., the IPv6 address 500 of FIG. 5), an IPv4 compatible address, and a group identifier for an end point. It is contemplated that one or more NS 608 may be implemented to maintain a mapping of at least those three records for each endpoint accessible by way of the network 606.

Because an IPv6 address as described with respect to embodiments of the present invention may be comprised of an IPv4 compatible address and a group identifier, it is contemplated that only the IPv6 address is maintained in an exemplary embodiment. The group identifier and/or the IPv4 compatible address may be identified from the IPv6 address. For example, the least significant X bits of an IPv6 address may be reviewed to identify a correlated IPv4 compatible address. Similarly, an intermediate significant Z bits may be reviewed to identify a group identifier. Further yet, it is contemplated that embodiments of the present invention maintain, in a name resolution table, an IPv4 compatible address, a group identifier, and an organization identifier for an endpoint. The three records may be used in combination to identify an IPv6 address as discussed herein. Any combination of the various records may be implemented so as to identify an IPv6 address, an IPv4 address, and a group identifier for a given endpoint.

The name resolution table 610 may be populated with information in a number of different manners. For example, an endpoint may supply the information. A network administrator may also supply the information. The information may be identified by investigating data packets passing through the network 606. The information may be identified by one or more services (e.g., 4 to 6 stack) associated with an endpoint. A local name resolution table cache may dynamically update information to a name resolution table at a NS.

The endpoint A 602 is comprised of an IPv4 compatible application 612, a virtual network interface card 614, a 4 to 6 stack 616, and a name resolution table cache A 618. The endpoint B 604 is comprised of an IPv4 compatible application 620, a virtual network interface card 622, a 4 to 6 stack 624, and a name resolution table cache B 626.

As previously discussed, an IPv4 compatible application, such as the IPv4 compatible application 612 or 620, is an application that addresses communications utilizing IPv4 standards. Consequently, in an exemplary embodiment, an IPv4 compatible application is not able to address communication (e.g., data packets) utilizing IPv6 addressing. Therefore, in this example, an IPv4 compatible application can not inherently utilize IPv6.

In an exemplary embodiment, an application, such as the IPv4 compatible application 612, is an endpoint to which data packets are sent from (e.g., source) or sent to (e.g., destination). The IPv4 compatible application 612, in an exemplary embodiment, is a service operating in a cloud computing environment.

The 4 to 6 stack 616 is a firmware, hardware, and/or software implementation that provides features of various embodiments of the present invention. For example, the 4 to 6 stack 616 may intercept name resolution responses from the NS 608 destined to the IPv4 compatible application 612. Upon intercepting the response (or a request in other embodiments) the 4 to 6 stack 616 may provide an IPv4 address of a destination. In an exemplary embodiment, the 4 to 6 stack 616 is a plug-in utilized by an operating system. In another exemplary embodiment, the 4 to 6 stack 616 is an operating system shim. By employing a 4 to 6 stack in connection with an operating system, the 4 to 6 stack only needs to be configured in connection with the operating system as opposed to each application individually. However, it is contemplated that the 4 to 6 stack is implemented by individual applications as well. Further, it is contemplated that the 4 to 6 stack is incorporated within a network routing device.

Additionally, the 4 to 6 stack 616 may invoke the virtual network interface card 614 to serve as an interface for the IPv4 compatible application 612. Further yet, the 4 to 6 stack may work in conjunction with the name resolution table cache A 618 to populate, maintain, update, and/or synchronize information. For example, the name resolution table cache A 618, in an embodiment, is a local cache of information accessible through the name resolution table 610.

The IPv4 compatible application 620, the virtual network interface card 622, the 4 to 6 stack 624 and the name resolution table cache B 626, in an exemplary embodiment, are comparable to those similarly named components previously discussed with respect to endpoint A 602.

Accordingly, any number of components may be employed to achieve the desired functionality within the scope of embodiments of the present invention. Although the various components of FIG. 6 are shown with lines for the sake of clarity, in reality, delineating various components is not so clear, and metaphorically, the lines would more accurately be grey or fuzzy. Further, although some components of FIG. 6 are depicted as single blocks, the depictions are exemplary in nature and in number and are not to be construed as limiting.

An exemplary embodiment of the present invention that utilizes components discussed in FIG. 6 is described hereinafter with respect to FIG. 7.

Figure 7:
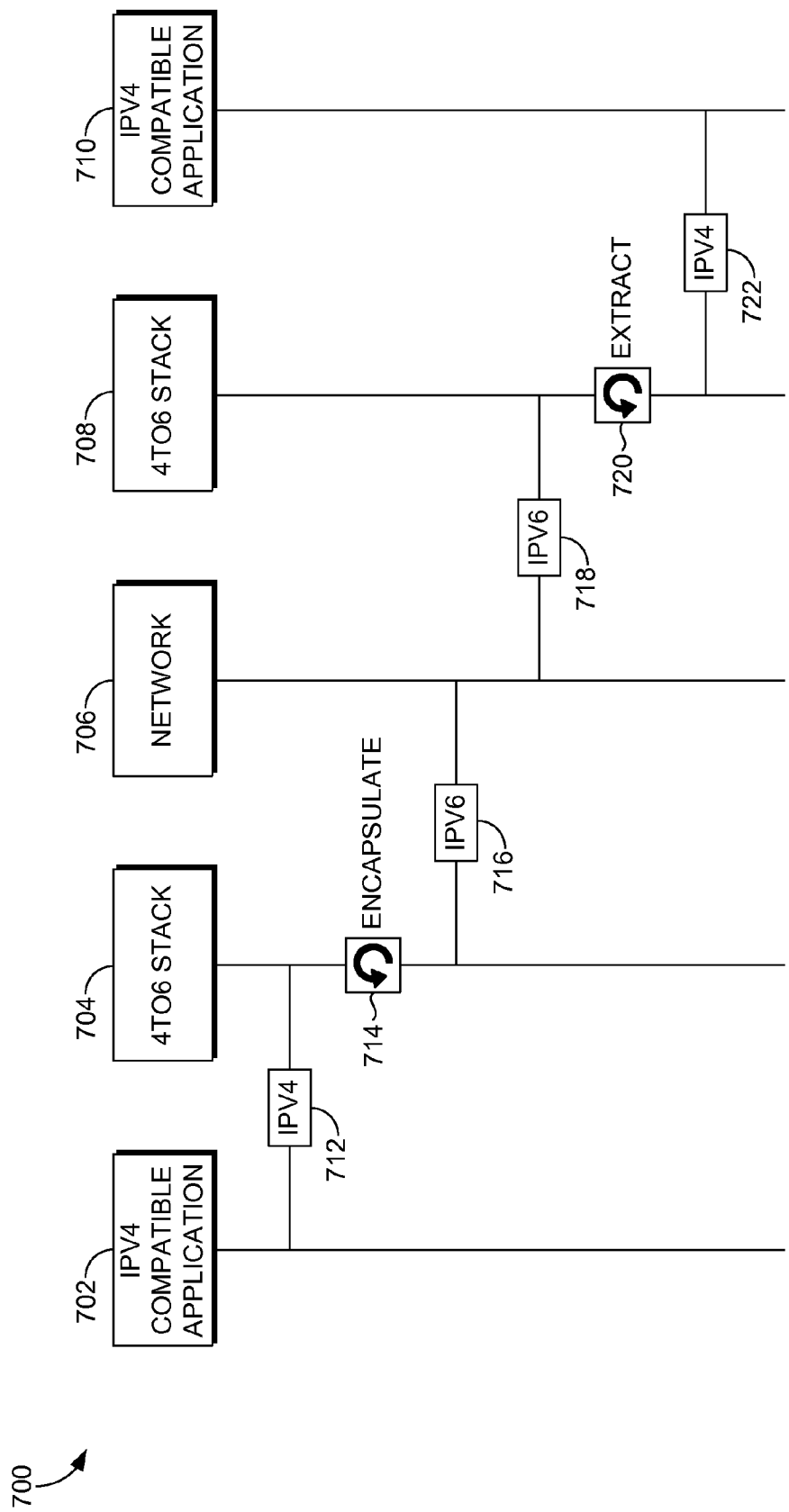
FIG. 7 depicts an exemplary flow of communication and processing in accordance with embodiments of the present invention.

FIG. 7 depicts an exemplary flow 700 of communication and processing in accordance with embodiments of the present invention. The flow 700 is among, at least in part, a source IPV4 compatible application 702, a 4 to 6 stack 704, a network 706, a 4 to 6 stack 708, and a destination IPv4 compatible application 710.

The following discussion surrounding and involving FIG. 7 is merely exemplary and is directed to embodiments of the present invention, but it is understood that additional embodiments are contemplated herein.

In an exemplary embodiment, a dynamic NS is used to register endpoints with a globally unique name, such as public fully qualified domain name that is then associated with a unique IPv6 address and a group identifier. In this example, and as previously discussed, the group identifier may be a group identifier and an organization identifier that together as one or as a combination consume the most significant 96 bits of a 128-bit IPv6 address. Continuing with this example, upon associating a globally unique name with an IPv6 address, a 4 to 6 stack is added within a calling path of an endpoint.

As illustrated in FIG. 7, the IPv4 compatible application (e.g., source) may intend to communicate a packet of data to a destination, the destination IPv4 compatible application 710, by way of the network 706. To accomplish the communication of a data packet in this example, the source IPv4 compatible application 702 initiates (not shown) a name server resolution request to a NS for the destination IPv4 compatible application 710. The NS then returns (not shown) to the source IPv4 compatible application 702 both an IPv4 and an IPv6 address for the destination IPv4 compatible application 710. If the least significant 32 bits of the returned IPv6 address correspond to the returned IPv4 address, a determination may be made that the IPv4 compatible application is able to utilize a 4 to 6 stack.

Continuing with FIG. 7, the 4 to 6 stack 704 may enter into a name resolution table (cache or original) a group identifier for the destination IPv4 compatible application 710. Additional information that may be entered includes the IPv6 address and/or a virtual IPv4 address (least significant 32 bits of the IPv6 address) for the destination IPv4 compatible application 710. The virtual IPv4 address, as previously discussed, is unique within the group identified by the group identifier, but the virtual IPv4 address may not be unique globally.

A unique virtual IPv4 and/or an IPv6 address may be obtained from an address server (not shown). For example, a pointer to the address server may be included in the name resolution provided by the NS when the source IPv4 compatible application 702 requests the resolution of the destination IPv4 compatible application 710. In this example, the address server may provide functionality that may be similarly provided by a DHCP server. As a result of the virtual unique IPv4 naming assignments, the source IPv4 compatible application 702 and the destination IPv4 compatible application 710 belong in a virtual overlay network that provides peer-level IPv4 semantics at a virtual level of communication, which therefore supports legacy IPv4 applications.

Continuing with the example illustrated at FIG. 7, the source IPv4 compatible application 702 generates and communicates a packet of data as IPv4 712 with the intent of delivery to the destination IPv4 compatible application 710. The 4 to 6 stack 704 intercepts the data packet communication and performs an encapsulation 714 process. The encapsulation 714 process places the IPv4 712 within an IPv6 data packet (e.g., as payload of the IPv6 packet). In an exemplary embodiment, a virtual NIC associated with the source IPv4 compatible application 702 is used by the source IPv4 compatible application 702 to communicate with the destination IPv4 compatible application 710. The 4 to 6 stack 704 identifies the communication from the virtual NIC to identify the destination. The destination has an IPv6 address that is comprised of a group identifier (which may include an organization identifier) of the virtual NIC and the IPv4 destination address indicated in the header of the communicated data packet. The group identifier and the IPv4 destination address may be used to generate an IPv6 address. This association between an IPv6, IPv4, and a group identifier may be maintained in a name resolution table cache or other repositories.

From the 4 to 6 stack 704, the encapsulated IPv4 communication is sent as an IPv6 716/IPv6 718 communication through the network 706. The IPv6 718 communication is intercepted by the 4 to 6 stack 708 that is associated with the destination IPv4 compatible application 710. An extraction 720 process is performed to strip away IPv6 header information to reveal an IPv4 data packet. The IPv4 data packet is communicated as an IPv4 722 communication to the destination IPv4 compatible application 710. It is understood that a virtual NIC may be associated with the destination IPv4 compatible application 710 to facilitate communicating an IPv4 message between the source IPv4 compatible application 702 and the destination IPv4 compatible application 710 that are associated with a common IPv4 virtual network.

The 4 to 6 stack 708 may utilize a number of detection techniques to identify those data packets that include encapsulated IPv4 data packets. It is contemplated that the IPv6 packet header includes a "flow label" or other flagging mechanism. Additionally, it is contemplated that an analysis is performed on the IPv6 source address accompanying the data packet. If the Y and Z most significant bits (e.g., 96 bits) of the source IPv6 address correspond to the Y and Z most significant bits of the IPv4 compatible application, an inference could be made that the communication is coming from an endpoint within the same group (and therefore potentially from the same virtual network) as the destination IPv4 compatible application 710.

Based on the above example and other embodiments provided herein, it is understood that unlike previous strategies to implement IPv6, one or both endpoint applications do not have to be IPv6 compatible in accordance with embodiments of the present invention. For example, a 6 to 4 (RFC 3056) allows IPv6 sites to communicate with each other over an IPv4 network without an explicit tunnel setup, but the end points must be IPv6 compatible. Similarly, IPv6 Tunnel Broker (RFC 3053) allows IPv6 hosts to connect to each other by way of IPv4 tunnel going through an IPv6 Tunnel Broker, but again the endpoints must be IPv6 compatible. Additionally, Teredo provides address assignment and host-to-host tunneling for unicast IPv6 traffic when an endpoint is behind an IPv4 network address translator (NAT), but again the endpoints must be IPv6 compatible. Further yet, Intra-Site Automatic Tunneling Addressing Protocol (ISATAP) (RFC 4214) also requires applications to be IPv6 compatible at the end points.

Additionally, previous strategies to problems addressed by embodiments of the present invention may require the use of globally unique IPv4 (e.g., stateless IP/ICMP translation RFC 2765). Further, another previous strategy may require an application level gateway for an IPv6 end point to address an IPv4 endpoint (e.g., NAT-PT and NAPT-PT RFC 4966). In an exemplary embodiment of the present invention, an application level gateway is not utilized to communicate between one or more IPv4 applications while realizing at least some of the advantageous of IPv6.

Figure 8:
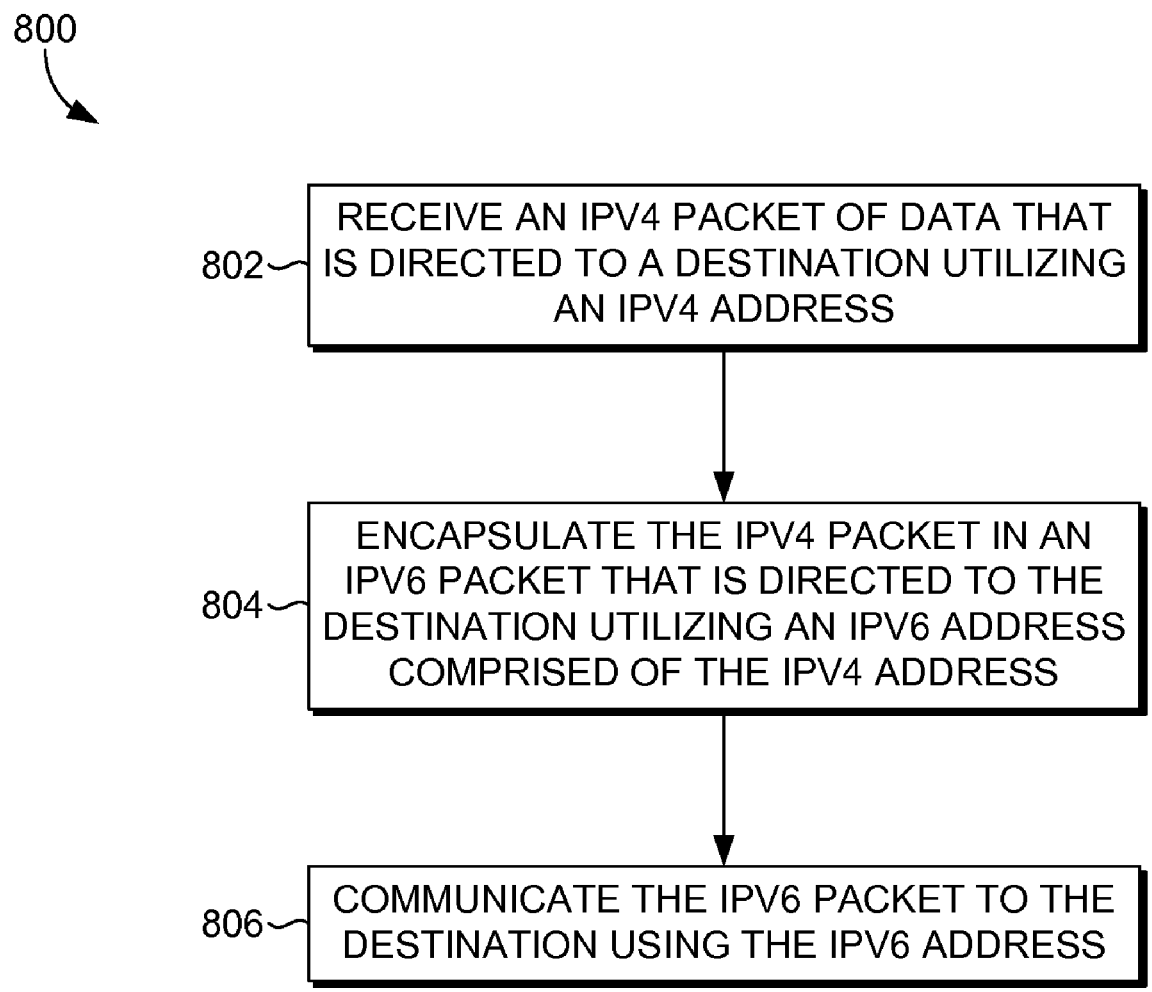
FIG. 8 depicts a block diagram representing an exemplary method of utilizing IPv6 addressing for communications from an IPv4 compatible application in accordance with embodiments of the present invention.

FIG. 8 depicts a block diagram representing an exemplary method 800 of utilizing IPv6 addressing for communications from an IPv4 compatible application in accordance with embodiments of the present invention. A block 802 depicts receiving an IPv4 packet of data communicated from a source IPv4 application. In an exemplary embodiment, the packet of data is directed to a destination utilizing an IPv4 address. The reception of the IPv4 packet of data may be an interception of the data by a 4 to 6 stack associated with the IPv4 compatible application.

At a block 804, the IPv4 packet of data is encapsulated as an IPv6 packet of data. As previously discussed, the encapsulation process may include adding an IPv6 header to the IPv4 packet causing the IPv4 packet to become data payload of the IPv6 packet. The IPv6 packet, in an exemplary embodiment, identifies a destination utilizing an IPv6 address that is comprised of an IPv4 address from the IPv4 packet of data and a group identifier (which may include a group identifier and/or an organizational identifier).

At a block 806, the IPv6 packet that encapsulates the IPv4 packet is communicated to the destination using the IPv6 address. It is understood that the process of encapsulating a data packet (e.g., an IPv4 packet within an IPv6 packet) may include all or portions of the encapsulated packet. For example, in an exemplary embodiment, header information may be removed from the IPv4 packet to reduce the size of the data payload within the IPv6 packet. Upon reaching a destination, the IPv4 header information that was removed may be determined from one or more sources (e.g., name resolution table, IPv6 addressing convention inference).

Figure 9:
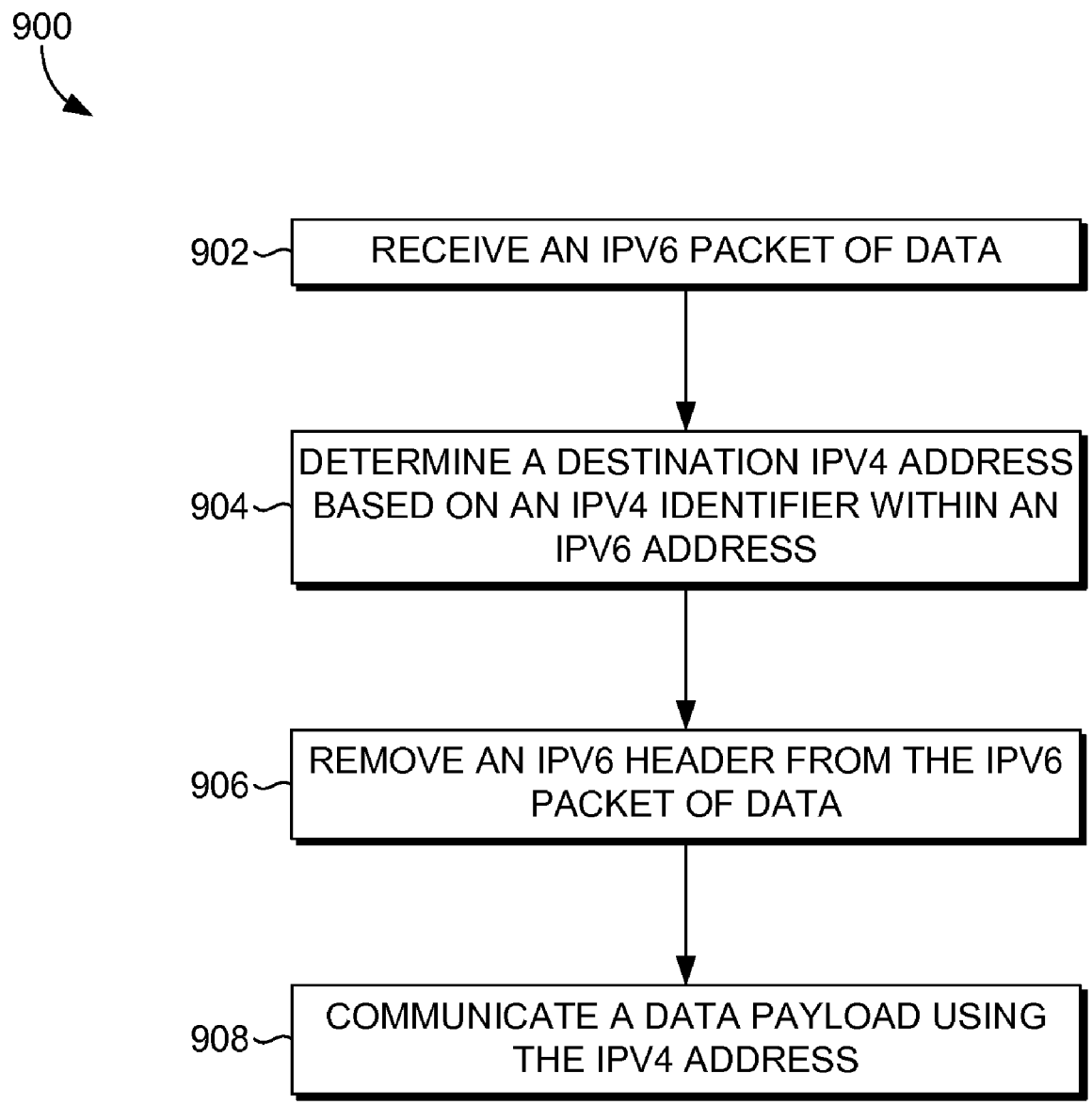
FIG. 9 depicts a block diagram representing an exemplary method of utilizing IPv6 addressing for communications to an IPv4 compatible application in accordance with embodiments of the present invention.

FIG. 9 depicts a block diagram representing an exemplary method 900 of utilizing IPv6 addressing for communications to an IPv4 compatible application in accordance with embodiments of the present invention. At a block 902, an IPv6 packet of data is received. In an exemplary embodiment, the IPv6 packet of data is comprised of a data payload and a globally unique IPv6 address of a destination. The data payload, in an exemplary embodiment is all or part of an encapsulated IPv4 packet of data. In this example, the IPv6 address of the destination is a 128-bit identifier that is comprised of an IPv4 compatible identifier. For example, the least significant 32 bits (4 bytes) may correspond to 32 bits of an IPv4 address.

At a block 904, a destination IPv4 address is determined based on, at least in part, the IPv4 compatible identifier included with the IPv6 address. In this example, the determined IPv4 address is not globally unique, but instead unique to a private network to which the destination is associated.

At a block 906 an IPv6 header is removed from the IPv6 packet of data. Stated differently, in an exemplary embodiment, an IPv4 packet of data is decapsulated (e.g., extracted) from an IPv6 packet of data that was used as a communication package. Therefore extracting an IPv4 packet from an Ipv6 packet leaves the IPv4 packet for use by a destination endpoint. For example, an IPv4 header and data payload of the IPv4 packet are extracted from the IPv6 packet by removing the IPv6 header, in an exemplary embodiment. The removal of an IPv6 header may include placing the IPv4 packet of data in compliance with IPv4 for eventual forwarding onto an identified destination.

At a block 908 the data payload from the IPv6 packet of data, which may be an IPv4 data packet, is communicated to a destination using the IPv4 address identified at block 904. As previously discussed, the IPv4 packet of data may be communicated to a virtual NIC that is associated with a group identifier included in the IPv6 address and/or associated with a destination identified by the IPv4 address. The Virtual NIC may be enacted by the 4 to 6 stack upon receiving an incoming data packet, receiving an outgoing data packet, and/or identification of an endpoint capable of benefiting from a 4 to 6 stack. Further, it is contemplated that a virtual NIC is associated with a group of applications that use the same virtual IPv4 address, but the applications are differentiated from one another by the ports that each application listens (e.g., monitors, communicated via). For example, each application in a group of application that share a common virtual IPv4 (e.g., non-globally-unique IPv4 address) utilizes a unique port number in a layer 4 stack, such as TCP or UDP.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of utilizing IPv6 addressing for communications from an IPv4 compatible application, the method comprising:
   receiving an IPv4 packet of data communicated from a first IPv4 application, wherein the packet of data is directed to a destination using an IPv4 address;
   encapsulating the IPv4 packet of data in an IPv6 packet of data, wherein the IPv6 packet of data is directed to the destination using an IPv6 address;
   the IPv6 address is comprised of the IPv4 address of the destination and a group identifier; and
   communicating the IPv6 packet of data to the destination using the IPv6 address.

2. The method of claim 1, wherein the receiving of the IPv4 packet of data is an interception of the IPv4 packet of data by a 4 to 6 stack.

3. The method of claim 1, wherein the first IPv4 application does not support IPv6 addressing.

4. The method of claim 1, wherein the destination is a second IPv4 application.

5. The method of claim 1, wherein the destination does not support IPv6 addressing.

6. The method of claim 1, wherein the IPv4 address is not a globally unique identifier.

7. The method of claim 1, wherein the IPv4 address is a unique identifier in a private network.

8. The method of claim 1, wherein the encapsulating is performed by a 4 to 6 stack associated with an operating system.

9. The method of claim 1, wherein the encapsulating is performed by a 4 to 6 stack associated with a network routing device.

10. The method of claim 1, wherein the IPv6 address is comprised of the group identifier utilizing 4 bytes, the IPv4 address utilizing 4 bytes, and an organization identifier utilizing 8 bytes.

11. The method of claim 1, wherein the least significant 4 bytes of the IPv6 address represent the IPv4 address.

12. The method of claim 1, wherein the first IPv4 application and the destination have a common group identifier.

13. The method of claim 12, wherein the group identifier is a 4-byte identifier.

14. One or more computer storage devices having computer-executable instructions embodied thereon, that when executed by a computing system having a processor and memory, cause the computing system to perform a method, the method comprising:
   receiving an IPv6 packet of data, wherein the IPv6 packet of data is comprised of a data payload and a globally unique IPv6 address of a destination, the IPv6 address is a 128-bit identifier;
   a predefined number of bits of the 128-bit identifier of the globally unique IPv6 address are an IPv4 address of the destination;
   determining a destination IPv4 address of the destination based on, at least in part, the IPv4 identifier portion of the globally unique IPv6 address;
   communicating the data payload to the destination using the destination IPv4 address.

15. The method of claim 14, wherein the IPv6 data packet is further comprised of a group identifier to which the destination and a source of the data payload is associated.

16. The method of claim 14, wherein the destination IPv4 address is the IPv4 identifier.

17. The method of claim 14, wherein the destination IPv4 address is determined from a name server resolution request using the IPv6 address.

18. The method of claim 14 further comprises extracting an IPv4 header and the data payload from the IPv6 packet of data.

19. The method of claim 14 further comprises removing an IPv6 header from the IPv6 packet of data leaving an IPv4 compatible packet of data comprised of the data payload.

20. A system of utilizing IPv6 addressing for communications from an IPv4 compatible application, the system comprising:
   a name server accessible by way of the Internet;
   a name resolution table associated with the name server, the name resolution table maintains a mapping of identifiers that are associated with a destination, wherein each mapping of the identifiers is a mapping between a private network IPv4 address and a globally unique IPv6 address comprised of the private network IPv4 address to which it is mapped;
   an IPv4 computer application that is functional to communicate an IPv4 data packet to the destination using a virtual network IPv4 address of the destination;
   a virtual network interface card (NIC) associated with the IPv4 computer application, the virtual NIC facilitates communicating the IPv4 data packet having the IPv4 address of the destination from the computer application to the destination;
   a 4 to 6 stack in communication with the virtual NIC, the 4 to 6 stack encapsulates the IPv4 data packet in an IPv6 data packet that is comprised of a globally unique IPv6 address of the destination; and
   the 4 to 6 stack identifies the globally unique IPv6 address utilizing a mapping in the name resolution table between the private network IPv4 address and the globally unique IPv6 address.

* * * * *

UNITED STATES PATENT AND TRADEMARK OFFICE
CERTIFICATE OF CORRECTION

PATENT NO. : 8,406,232 B2  
APPLICATION NO. : 12/817964  
DATED : March 26, 2013  
INVENTOR(S) : Alkhatib Page 1 of 1

It is certified that error appears in the above-identified patent and that said Letters Patent is hereby corrected as shown below:

In the Specification

Column 12, line 53, delete "decapsulated" and insert -- encapsulated --, therefor.

Signed and Sealed this  
Third Day of February, 2015

Michelle K. Lee  
*Deputy Director of the United States Patent and Trademark Office*